No. 752,452. PATENTED FEB. 16, 1904.
A. B. HOHMANN.
MEANS FOR SECURING MEASURING INSTRUMENTS CENTRALLY IN BOTTLES, &c.
APPLICATION FILED APR. 22, 1903.
NO MODEL. 3 SHEETS—SHEET 2.

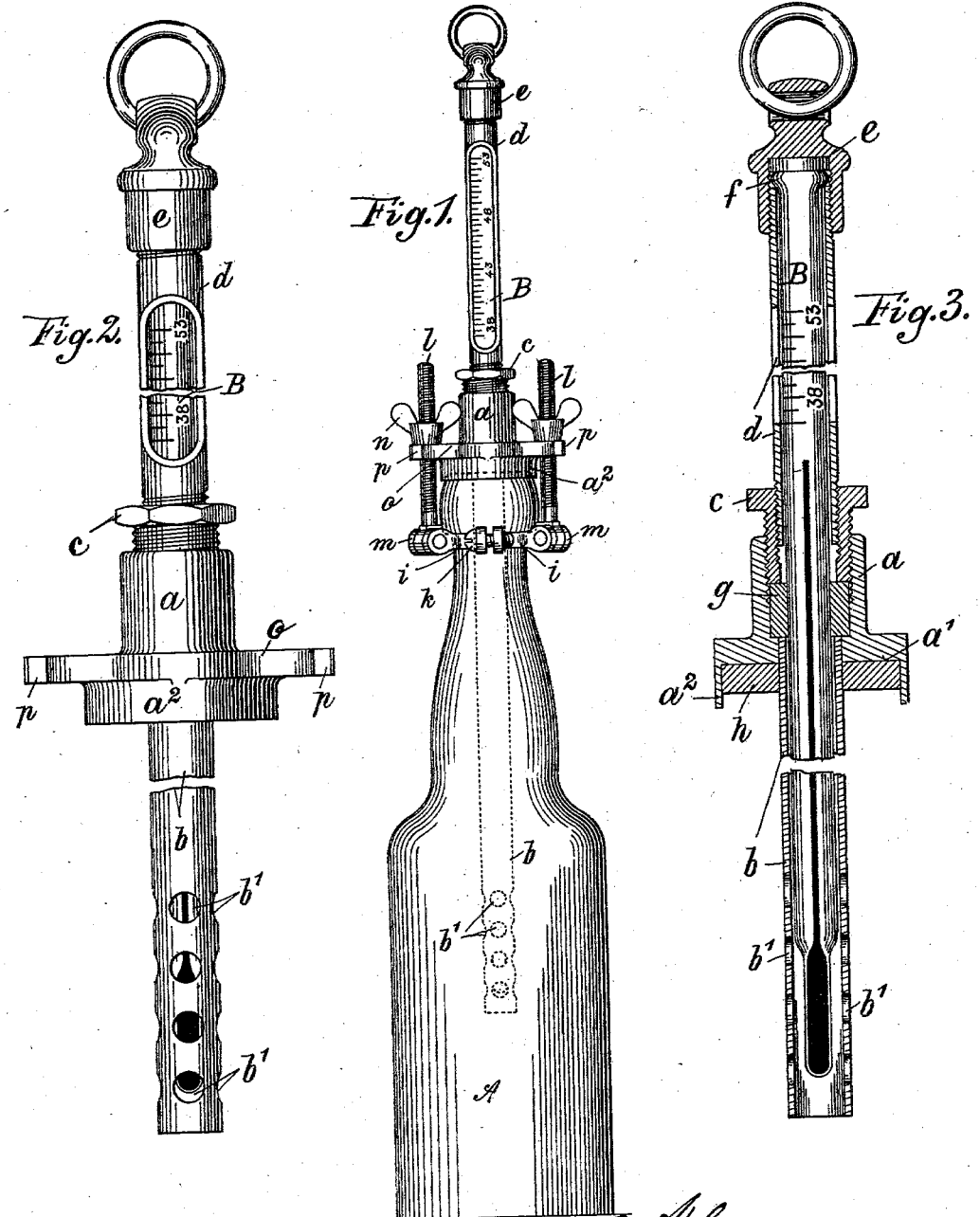

No. 752,452. PATENTED FEB. 16, 1904.
A. B. HOHMANN.
MEANS FOR SECURING MEASURING INSTRUMENTS CENTRALLY IN BOTTLES, &c.
APPLICATION FILED APR. 22, 1903.
NO MODEL. 3 SHEETS—SHEET 3.
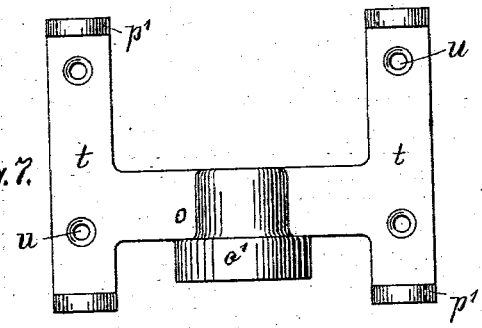
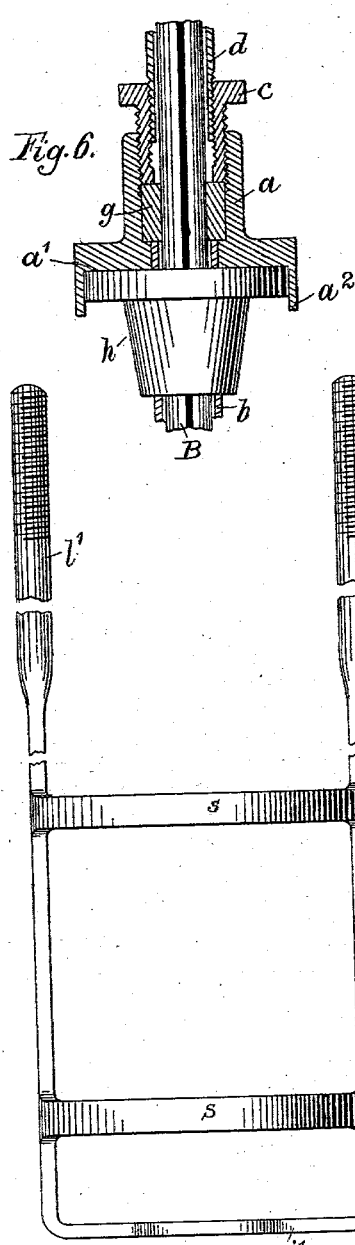
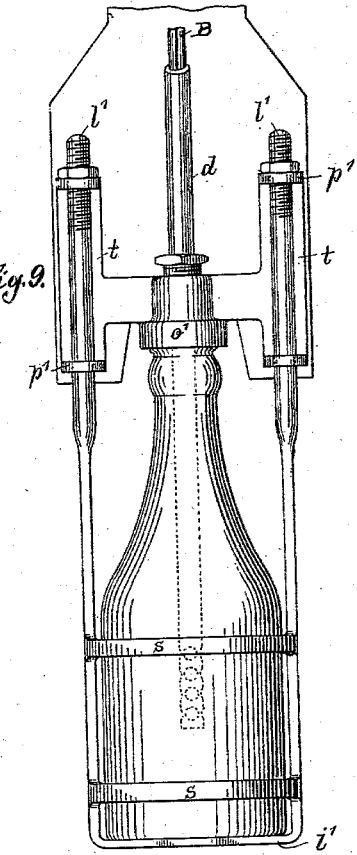

No. 752,452. Patented February 16, 1904.

UNITED STATES PATENT OFFICE.

AUGUST B. HOHMANN, OF RICHMOND HILL, NEW YORK, ASSIGNOR TO CHARLES J. TAGLIABUE, OF BROOKLYN, NEW YORK.

MEANS FOR SECURING MEASURING INSTRUMENTS CENTRALLY IN BOTTLES, &c.

SPECIFICATION forming part of Letters Patent No. 752,452, dated February 16, 1904.

Application filed April 22, 1903. Serial No. 153,864. (No model.)

*To all whom it may concern:*

Be it known that I, AUGUST B. HOHMANN, residing at Richmond Hill, county of Queens, and State of New York, have invented certain new and useful Improvements in Means for Securing Heat, Pressure, and other Measuring Instruments in Central Position in Bottles and other Vessels, of which improvements the following is a full, clear, and exact specification, reference being had to the accompanying drawings, wherein—

Figure 4:
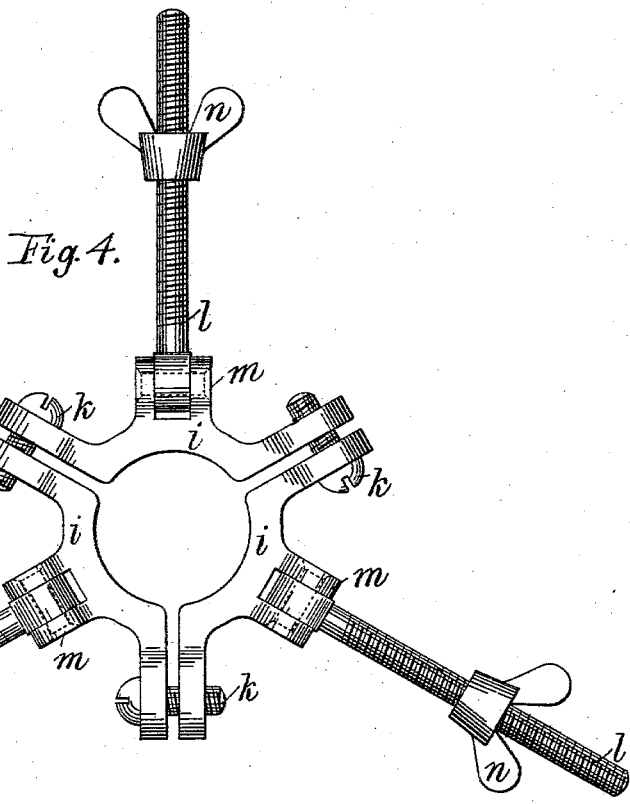
Figure 5:
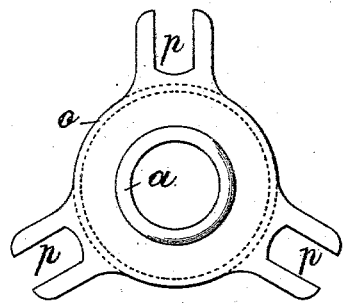

Figure 1 is an elevation of a bottle provided with my improved device for securing a thermometer in central position therein. Fig. 2 is an enlarged view of the holder for such measuring instrument forming part of my invention. Fig. 3 is a sectional view thereof. Figs. 4 and 5 are plan views of one form of the fastening device. Fig. 6 is a similar view like Fig. 3, showing the packing in the shape of a stopper for closing the mouth of the bottle. Fig. 7 is an elevation of a modified construction of the holder of the instrument. Fig. 8 is an elevation of a modified form of the device for securing the instrument-holder to the bottle. Fig. 9 is an elevation showing the modified forms of the devices illustrated in Figs. 7 and 8 joined together and with a support for the instrument.

My invention relates to means for securing instruments—as, for instance, thermometers, pressure-gages, &c.—in a central position within a bottle and in such manner that the neck of the bottle is thereby hermetically sealed.

In Fig. 1 of the drawings, A designates a bottle containing liquid to be sterilized, and B designates the upper end of a thermometer inserted in the bottle. This thermometer is set in a holder, which also serves for hermetically closing the mouth of a bottle or the aperture of a vessel to which it is applied. The holder comprises a perforated block $a$, having an enlarged base $a'$, terminating into a circular flange $a^2$. In this base $a'$ a metallic tube $b$ (called "armor") is secured, open on both ends and perforated at $b'$. The upper portion of block $a$ is internally screw-threaded, and a perforated and also internally-screw-threaded collar $c$ is screwed therein. In this collar $c$ tube $d$ (the other part of the armor) is screwed. The terminus of this tube $d$ is externally screw-threaded, and cap $e$ is screwed thereon. Thermometer B (or other measuring instrument) is inserted in tubes $b$ and $d$ and is held in position relatively thereto by its enlarged head $f$ resting upon the end of tube $d$ and held between it and the cap $e$. A packing-ring $g$ is fitted upon the thermometer B and fills the bore in block $a$. Collar $c$ serves to compress this packing $g$ so as to make the joint between the thermometer and the block $a$ absolutely airtight. The base of block $a$ is shaped as the form of a head of a bottle or the flange of the aperture of other similar vessel requires. Flange $a^2$, surrounding the base, forms a recess wherein the compressible packing $h$ is inserted. This packing rests on the mouth of the bottle (or the aperture of other vessel) when the instrument is set therein. Packing $h$ may also be made in the form of a stopper shown in Fig. 6; but the form shown in Figs. 1, 2, and 3 is preferable, and it may be used directly on the glass tube of an instrument, (for instance, thermometer) without the metallic tube $b$, which is used as an armor for protecting the glass tube of such an instrument against injury. By pressing block $a$ tightly upon the vessel the latter is hermetically sealed, and the escape of gas, &c., is thereby prevented. This is accomplished by devices illustrated in Figs. 4 and 5 and in Figs. 7, 8, and 9. Fig. 4 illustrates the lower part of a clamp to be used in connection with the cap shown in plan view in Fig. 5. The cap is set upon block $a$ or made integral therewith, and the lower part of the clamp, consisting, preferably, of three flanged segments $i$, joined together by screws $k$, is affixed to the bottle underneath its head. To each one of the three segments $i$ a screw $l$ is hinged at $m$, and upon each of the screws $l$ a thumb-screw nut $n$ is fitted. Cap $o$ is provided with lugs $p$, whose position corresponds to that of the screws $l$. This device is to be used on any form of bottles or other vessels having an enlarged head. To affix the thermometer to a bottle, segments $i$ are joined together around the neck thereof, as shown in Fig. 1, and cap o if not made integral with the block a is set thereon. Then screws l are slid between the prongs of lugs p and the thumb-screws n screwed thereon to press block a upon the mouth of the bottle. In this manner the instrument—a thermometer, pressure-gage, or whatever it may be—is safely and reliably secured in central position in the bottle and is so secured that it will always remain in that central position no matter whether the bottle is standing upright or laid down horizontally.

The modified construction shown in Fig. 7 is adapted for use in connection with bottles which are not provided with enlarged heads or when for some reason or another the clamp composed of the segmental parts shown in Fig. 4 cannot be used. In this case I use in place of segments i a frame composed of plate i', shaped in conformity with the bottom of the bottle, and screw-threaded posts l' integral therewith or hinged thereto in the same manner as the screws l are hinged to the segments i of the ring. Posts l' may be joined together by ties s, and two, three, or more of such ties may be used, as the shape and dimensions of the vessel may require. The ends of the posts l' are screw-threaded and fitted into lugs p' of cap o, being of course hinged correspondingly to the position of these lugs. Sometimes—for instance, when the bottles are immersed in a tank—it is desirable to support the part of the instrument extending beyond the bottle and to protect it against bending or breaking when in use. To facilitate such an arrangement, the cap designated o in the aforedescribed arrangement of my device is made in the form shown in Fig. 8. As there shown the cap o' is provided with wings t, having bores u for affixing them to the support for the instrument, and the lugs p' are produced by bending the ends of the wings at right angles to the plane of the wings. In these lugs slots or holes are provided for the screw-threaded ends of the posts l', according to what form of the device for securing the bottle thereto is used. In Fig. 9 the modified form of cap o' shown in Fig. 7 is used in connection with the modified form of the bottle-holding device illustrated in Fig. 8, as hereinbefore explained.

In the sterilizing process it is of great importance that the temperature of the liquid subjected to the sterilizing process be exactly ascertained. As a rule the sterilizing is done in a tank containing hot water. The heat of this water is communicated to the liquid within the bottle through the glass. The heat acts upon the liquid within the bottle from the walls thereof and toward the center, and it is therefore of the utmost importance for the sterilizing process to ascertain the degree of heat as nearly in the center of the bottle as possible.

When a thermometer is merely suspended in the bottle, care must be taken that the bottle is firmly maintained in an upright position, because a deflection therefrom causes the thermometer to swing to one side of the bottle, where the liquid is naturally more heated. For this reason such apparatus is not as reliable. By means of my improved device the thermometer is safely fixed in a central position in the bottle, so that it cannot be deflected, no matter what position is given to the bottle.

This improved device can also with equal advantage be used for securing a self-registering thermometer in such central position in the bottle. The device for that purpose is the same except that the upper tube d and cap e are omitted and in place of the screw-threaded collar c a plug is used.

The ring composed of segments i may be made up of two or four and, in fact, any number of such segments instead of three, as shown in the drawings; but the use of three parts, with the screws arranged as shown in the drawings, possesses the advantage that the adjusting and securing in position of the thermometer in the center of the bottle is thereby facilitated. If, for instance, the head of the bottle should not be exactly even, the adjustment of the instrument in central position would be more difficult if only two or more than three screws were used. If, however, three screws are used, any deflection of the instrument from the axial line of the bottle caused by the uneven head of the bottles can be corrected by manipulating the screws.

I claim as my invention—

1. A holder for measuring instruments for securing the same in central position within a vessel, comprising a perforated, internally flanged and screw-threaded block, an externally-screw-threaded collar, a packing-ring set in the block between the collar and the internal flange of the block, a perforated compressible packing secured to the base of the block, a perforated cap, having radially-projecting lugs, set on the block; a holder for the vessel having screw-threaded members set in position to engage with the lugs of the cap, and screw-nuts set thereon.

2. A device for securing measuring instruments in central position within a bottle or similar vessel, comprising a perforated, internally flanged and screw-threaded block, an externally and internally screw-threaded collar, a packing-ring set in the block between the collar and the internal flange of the block, and a perforated cap, having radially-projecting lugs, set on the block; a ring composed of separably-connected segments, screw-threaded members joined to the ring in position to engage with the lugs of the cap and screw-nuts set thereon.

3. A device for securing measuring instruments in central position within a bottle or similar vessel, comprising a perforated, internally flanged and screw-threaded block, an externally and internally screw-threaded collar, a packing-ring set in the block between the collar and the internal flange of the block, and a perforated compressible packing secured to the base of the block; a perforated cap having three radially-projecting lugs, set on the block; a ring composed of three separably-connected segments, screw-threaded members pivoted, one to each of the segments of the ring in position to engage with the lugs of the cap and thumb-nuts set thereon.

AUGUST B. HOHMANN.

Witnesses:
ROBERT VALENTINE MATHEWS,
JOHN A. PAULSON.